United States Patent [19]

Lauritzen et al.

[11] Patent Number: 5,387,009
[45] Date of Patent: Feb. 7, 1995

[54] END BASE ASSEMBLY FOR VEHICLE AIRBAG MODULE

[75] Inventors: Donald R. Lauritzen, Hyrum; Larry D. Rose, Layton, both of Utah

[73] Assignee: Morton International, Inc., Chicago, Ill.

[21] Appl. No.: 259,852

[22] Filed: Jun. 15, 1994

Related U.S. Application Data

[63] Continuation-in-part of Ser. No. 213,176, Mar. 14, 1994.

[51] Int. Cl.⁶ ............................................. B60R 21/28
[52] U.S. Cl. ................................. 280/741; 280/732; 280/736; 102/531
[58] Field of Search ............... 280/728 R, 741, 732, 280/736, 728; 102/580, 531, 380

[56] References Cited

U.S. PATENT DOCUMENTS

| | | | |
|---|---|---|---|
| 3,532,359 | 10/1970 | Teague et al. | 280/741 |
| 4,370,930 | 1/1983 | Strasser et al. | 280/741 X |
| 4,950,458 | 8/1990 | Cunningham | 280/736 X |
| 5,031,932 | 7/1991 | Franton et al. | 280/741 |
| 5,199,741 | 4/1993 | Swann et al. | 102/531 X |
| 5,201,542 | 4/1993 | Thuen et al. | 102/530 |
| 5,219,178 | 6/1993 | Kobari et al. | 280/732 X |

FOREIGN PATENT DOCUMENTS 2265582  10/1993  United Kingdom ............... 280/741

Primary Examiner—Richard M. Camby
Assistant Examiner—Christopher P. Ellis
Attorney, Agent, or Firm—George W. Rauchfuss, Jr.; Gerald K. White

[57] ABSTRACT

The cylindrical inflator housing of a passenger-side airbag module encloses a cylindrical filter pack containing the gas generant. The ends of the housing are closed by a pair of circular end bases which are press-fitted against the ends of the filter pack and provide improved heat transmission characteristics from the outside of the housing to the interiors of the end bases. In place of O-rings, the end bases are sealed to the housing by sheet gaskets.

12 Claims, 2 Drawing Sheets

END BASE ASSEMBLY FOR VEHICLE AIRBAG MODULE

RELATED APPLICATION

This application is a continuation-in-part of U.S. application Ser. No. 08/213,176 filed Mar. 14, 1994 pending by D. R. Lauritzen, D. J. Green, and L. D. Rose for COMBINED REACTION CAN AND INFLATOR WITH EXTRUDED GENERANT and assigned to the same assignee as the present invention.

TECHNICAL FIELD

This invention relates to the field of automotive airbag modules. More particularly, it relates to an improved filter pack and base construction for passenger side airbag modules.

BACKGROUND ART

The passenger side airbag module assembly for a motor vehicle normally includes a trough-shaped reaction canister which holds the folded airbag and is installed behind the dash board. An inflator housing is associated with the reaction canister and encloses a gas generant normally contained, in turn, within a cylindrical filter pack. The filter pack is a steel mesh material retained within the inflator housing by a base or bases. These bases are normally installed by welding, or swaging the inflator housing around their ends. Upon the occurence of a collision of sufficient magnitude, the generator is ignited and gases from the burning charge pass through openings in the inflator housing to inflate the airbag.

Airbag modules constructed in accordance with the prior art have certain deficiencies which it would be desirable to overcome. Many of these deficiencies relate to the end bases which close the inflator housing. Conventionally, these bases require a seal between the base and the filter pack and diameters that fit tight in the inflator housing for centering. These filter packs in turn require a sizing operation to control their diameter tolerance for installation in the inflator housing.

Another problem arises where seals between the bases and filter pack are used. There is a tendency for the seal to off-gas causing flaming subsequent to airbag actuation.

A further problem arises from the need for an auto ignition charge within the inflator. The purpose of this charge is to set off the main gas generant causing the inflator to function early, in the event of a warehouse or vehicle fire, at a temperature where the inflator housing and reaction canister still retain their structural integrity. This requires good heat transfer to the auto ignition charge and good access of the ignited auto ignition charge to the inflator igniter. To that effect, it would be desirable to improve the heat transfer characteristics from the outer wall to the auto ignition charge.

Accordingly, it is a primary object of the present invention to provide an end base construction which is not orientation critical. Another object is to provide such a construction wherein sealing is improved without the need for O-rings. Another object is to provide such a construction wherein the ends of the filter pack are removed from the gas path. Another object is to provide such a construction wherein the heat transmission characteristics from the outer wall of the inflator housing to the internally housed auto ignition charge is improved. Other objects, features and advantages will become apparent from the following description and appended claims.

DISCLOSURE OF INVENTION

The present invention includes a substantially cylindrical inflator housing having a ported sidewall for venting inflating gas to an airbag. A gas generant assembly is positioned within the housing and includes a substantially cylindrical filter which encloses a gas generant. A first cup-shaped end base has a circular main body which closes the end of the inflator housing, a cylindrical outer wall which surrounds one end of the filter within the inflator housing sidewall, and a cylindrical inner wall which extends from the main body parallel to the outer wall. A preload member is positioned between the inner wall of the base and the gas generant.

A second end base closes the opposite end of the inflator housing. It is very similar to the first end base, but also includes means for retaining an initiator. Both end bases are free of any positive restraints of rotational movement about the longitudinal axis of the cylindrical filter. Means are provided for compressing a sheet gasket against each of the end bases to seal the ends of the inflator housing.

BEST MODE FOR CARRYING OUT THE INVENTION

Figure 1:
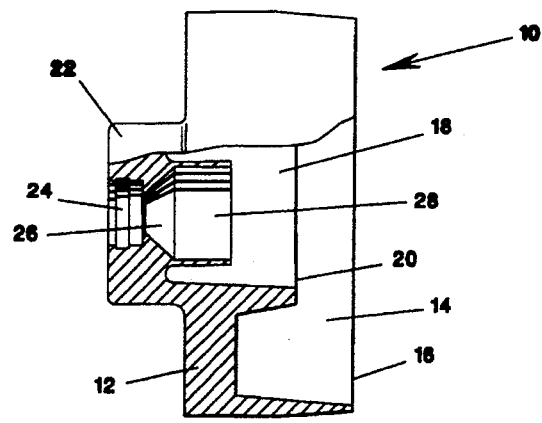
FIG. 1 is an elevational view in partial cross-section of an igniter end base in accordance with the present invention.

FIG. 1 illustrates an initiator end base 10 in accordance with the present invention. It is made from a material of good heat conductivity such as, for example, aluminum. It is basically cup-shaped and includes a circular main body 12 surrounded by a wall 14 which has the form of an annular wedge and tapers to a narrow rim 16. Extending from the body 12 and concentric with outer wall 14 is a shorter inner wall 18 which tapers to a relatively thicker rim 20. A cylindrical boss 22 protrudes from the opposite side of the body 12 and defines a multi-diametered cylindrical opening 24 terminating in a conical seat 26 surrounded by a relatively thin cylindrical retainer 28.

Figure 2:
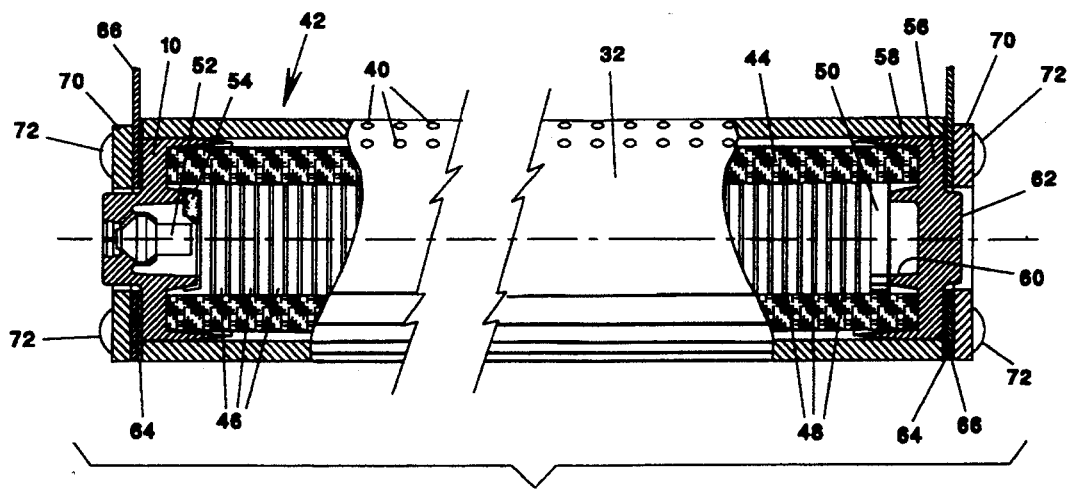
FIG. 2 is an elevational view, also in partial cross-section, of an inflator housing enclosing a filter pack assembly in accordance with the present invention.
Figure 3:
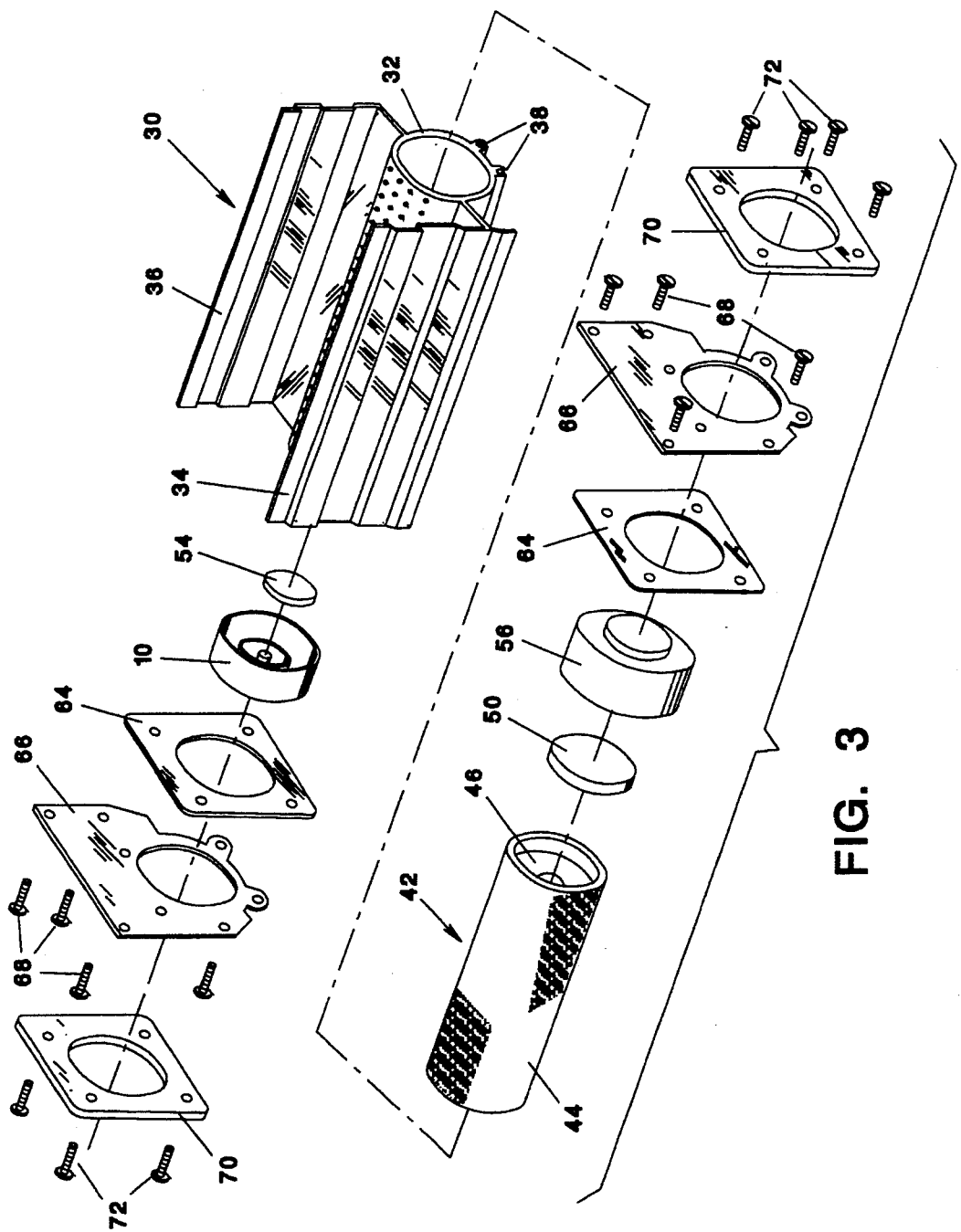
FIG. 3 is an exploded isometric view illustrating the assembly of an inflator in accordance with the present invention.

The various features of the invention will be best understood and appreciated by reference to FIGS. 2 and 3. FIG. 3 illustrates a combined reaction canister 30 and ignition chamber 32. The reaction canister 30 includes sidewalls 34, 36 which form a trough for containing a folded airbag. The canister and ignition chamber may be extruded from, for example, aluminum, and may include such features as screw retention channels 38, only two of which are illustrated. One wall of the ignition chamber 32 also forms the floor of the reaction canister 30 and is provided with openings 40 (FIG. 2) which emit inflating gas into the airbag.

The inflating gas is generated from a filter pack 42. Filter pack 42 comprises a cylindrical mesh screen 44 which contains the gas generant. The generant may take any of a number of forms. The one illustrated comprises a stack of pyrotechnic washer-like disks 46 separated by screen washers 48 which provide gas paths to the openings 40. One end of the filter pack 42 includes a preload 50. The preload 50 may be of any desired type such as a silicone wafer used in the prior art or, preferably, it may be of the type disclosed in co-pending U.S. application Ser. No. 08/212258 filed Apr. 14, 1994 by D. R. Lauritzen and J. L. Ralston titled Generant Preload and Tolerance Takeup Assembly and assigned to the same assignee as the present invention. The disclosure of that application is incorporated herein by reference.

A conventional initiator 52 is mounted in the conical seat 26 of the initiator end base 10 and the retainer 28 is crimped upon it as illustrated in FIG. 2 to hold it in place. The cavity between the outer wall 14 and the inner wall 18 receives the auto ignition charge which is held in place by a cup-shaped screen 54. The assembled initiator end base 10 is press fitted onto the end of the filter pack 42. The tapered outer wall 14 centers and compresses the end of the mesh screen 44 and the rim 20 of inner wall 18 presses against the generant charge. Because the filter pack 42 and the initiator end base 10 are both circular and symmetrical, their rotational relationship is unimportant.

The opposite end of the filter pack 42 is closed by an end base 56. As will be seen in FIG. 2, the end base 56 is very similar to the initiator end base 10 but does not include means for retaining an initiator. It does, however, include a similar outer wall 58 and inner wall 60 and a raised boss 62 on its outer surface. The end base 56 is mounted on the end of the filter pack 42 in a similar fashion as the initiator end base 10 and similarly centers and compresses the mesh screen 44. It will also be noted that the inner wall 60 bears against and compresses the preload 50 to maintain the pyrotechnic disks 46 under compression.

The filter pack 42 assembly including the end bases 10 and 56 is inserted within the ignition chamber 32 and a flat gasket 64 is applied to each end. An end plate 66 is secured to each end of the reaction canister 30 by means of screws 68, thereby completing the trough of the reaction canister. Finally, retaining plates 70 are mounted to the assembly by means of screws 72 which extend into screw retention channels (not illustrated) formed in the reaction canister.

It will now be apparent that the construction described above has fully met all the objectives of this invention. The round bases can be easily manufactured with only minor machining required and they require no orientation relative to the filter pack. They may be press fitted onto the ends of the filter pack, and the outer walls become end seals which keep the ends of the filter pack out of the gas path. The flat faces on the end bases permit use of a flat gasket rather than an O-ring, which improves the sealing. Furthermore, there is a substantial area of engagement between the outer wall 14 of the initiator end base 10 with the inner surface of the wall of the ignition chamber 32. As a result, the heat transfer path from the outer wall of the canister 30 to the auto ignition charge is greatly enhanced.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. An inflator for a motor vehicle passenger-side airbag module which comprises:
    a substantially cylindrical inflator housing having first and second ends and a ported sidewall for venting inflating gas to an airbag;
    a generant assembly within said inflator housing including a substantially cylindrical filter having first and second ends and enclosing a gas generant therein;
    a substantially cup-shaped first end base having a circular main body closing the first end of said inflator housing, a cylindrical outer wall surrounding the first end of said filter and enclosed within the sidewall of said inflator housing, and a cylindrical inner wall extending from the main body parallel to said outer wall;
    a pre-load member intermediate, and compressed between, said inner wall and said gas generant;
    a substantially cup-shaped second end base having a circular main body closing the second end of said inflator housing, a cylindrical outer wall surrounding the second end of said filter and enclosed within the sidewall of said inflator housing, and a cylindrical inner wall extending from the main body parallel to said outer wall in contact with said gas generant, and means for retaining an initiator within said inner wall;
    each of said first and second end bases being free of positive restraints against rotational movement about the longitudinal axis of said cylindrical filter; and
    means for compressing each of said first and second end bases against the respective ends of said cylindrical filter and sealing the junction of said outer wall with said inflator housing.

2. The inflator of claim 1 wherein said compressing means comprises a sheet gasket.

3. The inflator of claim 1 wherein said initiator retaining means comprises:
    a seat formed in the body of said second end base and within said cylindrical inner wall; and
    a retainer wall surrounding said seat and crimpable over an initiator positioned in said seat.

4. The inflator of claim 1 wherein the outer wall of each of said first and second end bases is in the form of an annular wedge having a press-fit engagement with the respective first or second end of said filter.

5. The inflator of claim 4 wherein said compressing means comprises a sheet gasket.

6. The inflator of claim 5 wherein said initiator retaining means comprises:
    a seat formed in the body of said second end base and within said cylindrical inner wall; and
    a retainer wall surrounding said seat and crimpable over an initiator positioned in said seat.

7. An inflator for a motor vehicle passenger-side airbag module which comprises:
    a trough-shaped reaction canister with an integral, substantially cylindrical, inflator housing having first and second ends and a ported sidewall for directing inflating gas to an airbag housed within said canister;
    a generant assembly within said inflator housing including a substantially cylindrical filter having first and second ends and enclosing a gas generant therein;

a substantially cup-shaped first end base having a circular main body closing the first end of said inflator housing, a cylindrical outer wall surrounding the first end of said filter and enclosed within the sidewall of said inflator housing, and a cylindrical inner wall extending from the main body parallel to said outer wall;

a pre-load member intermediate, and compressed between, said inner wall and said gas generant;

a substantially cup-shaped second end base having a circular main body closing the second end of said inflator housing, a cylindrical outer wall surrounding the second end of said filter and enclosed within the sidewall of said inflator housing, and a cylindrical inner wall extending from the disk-shaped bottom parallel to said outer wall in contact with said gas generant, and means for retaining an initiator within said inner wall;

each of said first and second end bases being free of positive restraints against rotational movement about the longitudinal axis of said cylindrical filter; and means for compressing each of said first and second end bases against the respective ends of said cylindrical filter and sealing the junction of said outer wall with said inflator housing.

8. The inflator of claim 7 wherein said compressing means comprises a sheet gasket.

9. The inflator of claim 7 wherein said initiator retaining means comprises:
a seat formed in the body of said second end base and within said cylindrical inner wall; and
a retainer wall surrounding said seat and crimpable over an initiator positioned in said seat.

10. The inflator of claim 7 wherein the outer wall of each of said first and second end bases is in the form of an annular wedge having a press-fit engagement with the respective first or second end of said filter.

11. The inflator of claim 10 wherein said compressing means comprises a sheet gasket.

12. The inflator of claim 11 wherein said initiator retaining means comprises:
a seat formed in the circular main body of said second end base and within said cylindrical inner wall; and
a retainer wall surrounding said seat and crimpable over an initiator positioned in said seat.

* * * * *